(12) United States Patent
Ueki et al.

(10) Patent No.: US 9,336,486 B2
(45) Date of Patent: May 10, 2016

(54) ATTRIBUTE VALUE ESTIMATION DEVICE, ATTRIBUTE VALUE ESTIMATION METHOD, PROGRAM, AND RECORDING MEDIUM

(75) Inventors: Kazuya Ueki, Koto-ku (JP); Yasuyuki Ihara, Koto-ku (JP); Masashi Sugiyama, Meguro-ku (JP)

(73) Assignees: NEC Solution Innovators, Ltd., Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 385 days.

(21) Appl. No.: 13/992,614

(22) PCT Filed: Nov. 17, 2011

(86) PCT No.: PCT/JP2011/076516
§ 371 (c)(1),
(2), (4) Date: Jun. 7, 2013

(87) PCT Pub. No.: WO2012/077476
PCT Pub. Date: Jun. 14, 2012

(65) Prior Publication Data
US 2013/0254143 A1    Sep. 26, 2013

(30) Foreign Application Priority Data

Dec. 8, 2010   (JP) ................................ 2010-273829

(51) Int. Cl.
*G06N 3/04*        (2006.01)
*G06N 5/02*        (2006.01)
(Continued)

(52) U.S. Cl.
CPC .............. *G06N 5/02* (2013.01); *G06K 9/00288* (2013.01); *G06K 9/6278* (2013.01);
(Continued)

(58) Field of Classification Search
CPC ........................................................ G06N 5/02
See application file for complete search history.

(56) References Cited

U.S. PATENT DOCUMENTS

| 2007/0183653 | A1  | 8/2007 | Medioni et al. |
| 2009/0087038 | A1* | 4/2009 | Okada et al. ................. 382/118 |

FOREIGN PATENT DOCUMENTS

| CN | 101000686 A | 7/2007 |
| JP | 2005-148880 A | 6/2005 |
| JP | 2007-058828 A | 3/2007 |

OTHER PUBLICATIONS

Communication dated Jan. 29, 2015, issued by the State Intellectual Property Office of P.R. China in counterpart Chinese application No. 201180059057.3.

(Continued)

*Primary Examiner* — Stanley K Hill
*Assistant Examiner* — Ola Olude Afolabi
(74) *Attorney, Agent, or Firm* — Sughrue Mion, PLLC

(57) ABSTRACT

The present invention provides an attribute value estimation device capable of yielding highly accurate estimation results even when people from multiple races are estimation targets. The attribute value estimation device for estimating, from data input thereto, an attribute value of the data includes: a data acquisition unit (1) that acquires data for which an attribute value is to be estimated; a discrete quantity estimation unit (2) that estimates the attribute value as a discrete quantity based on the data acquired by the data acquisition unit (1) and in accordance with a previously learned determination criterion; a first LSPC (3) that estimates the attribute value as a discrete quantity based on data input from the discrete quantity estimation unit (2); and an integration unit (4) that integrates a first discrete quantity estimation value estimated by the discrete quantity estimation unit (2) and a second discrete quantity estimation value estimated by the first LSPC (3).

17 Claims, 7 Drawing Sheets

(51) Int. Cl.
    G06N 7/00      (2006.01)
    G06Q 30/02     (2012.01)
    G06K 9/00      (2006.01)
    G06K 9/62      (2006.01)
(52) U.S. Cl.
    CPC ........... G06K 9/6292 (2013.01); G06N 3/0427 (2013.01); G06N 7/005 (2013.01); G06Q 30/02 (2013.01); *G06K 2009/00322* (2013.01)

(56) References Cited

OTHER PUBLICATIONS

Communication dated Sep. 3, 2014, issued by the Japan Patent Office in corresponding Japanese Application No. 2012-547761.

Sugiyama, Masashi, "Superfast Probabilistic Classifier", IEICE Technical Report, The Institute of Electronics, Information and Communication Engineers, Jan. 2010, SP2009-97_SP2009-147, pp. 127 to 132.

Kazuya Ueki et al., "Perceived Age Estimation under Lighting Condition Change by Covariate Shift Adaptation", 20th International Conference on Pattern Recognition ( ICPR2010), Aug. 2010, pp. 3400-3403.

Masashi Sugiyama et al., "Least Squares Conditional Density Estimation", IEICE Trans. on Information and Systems, 2010, pp. 583-594, vol. E93-D, No. 3.

Masashi Sugiyama, "Superfast-Trainable Multi-Class Probabilistic Classifier by Least-Squares Posterior Fitting" IEICE Trans. on Information and Systems, 2010, pp. 2690-2701, vol. E93-D, No. 10.

Kazuya Ueki et al., "Multi-Race Age Estimation Based on the Combination of Multiple Classifiers", Proceedings of the First Asian Conference on Pattern Recognition, (ACPR2011), No. 28-30, (5 pages total), Beijing, China, 2011.

Yasuyuki Ihara et al., "Multi-Race Age-Group Classification using the Weighted Integration of Multiple Classifiers", Proceedings of Dynamic Image Processing for Real Application Workshop,(DIA2011), (7 pages total), Tokushima, 2011.3.3-4.

* cited by examiner

ATTRIBUTE VALUE ESTIMATION DEVICE, ATTRIBUTE VALUE ESTIMATION METHOD, PROGRAM, AND RECORDING MEDIUM

This is a National Stage Entry of Application No. PCT/JP2011/076516 filed Nov. 17, 2011, claiming priority based on Japanese Patent Application No. 2010-273829 filed Dec. 8, 2010, the contents of all of which are incorporated herein by reference in their entirety.

TECHNICAL FIELD

The present invention relates to an attribute value estimation device, an attribute value estimation method, a program, and a recording medium.

BACKGROUND ART

Conventional attribute value estimation devices for estimating, from data input thereto, an attribute value of the data include those that estimate an attribute value of input data by extracting features of the data and then comparing the thus-extracted features with features of training samples that the devices have learned previously. In such devices, estimation results may be treated as discrete quantities (Patent Document 1) or as continuous quantities (Patent Document 2).

CITATION LIST

Patent Document(s)

Patent Document 1: JP 2007-58828 A
Patent Document 2: JP 2005-148880 A

SUMMARY OF THE INVENTION

Problem to be Solved by the Invention

In estimation of a face attribute value such as an age by the above-described devices, the devices can yield highly accurate estimation results when people from a specific race, such as Japanese, are estimation targets. However, when estimation targets are face images of people from multiple races including various facial features, training samples might be biased, so that it is difficult to achieve the same level of accuracy as that achieved when the estimation targets are people from a specific race.

With the foregoing in mind, it is an object of the present invention to provide an attribute value estimation device, an attribute value estimation method, a program, and a recording medium, with which highly accurate estimation results can be obtained even when people from multiple races are estimation targets.

Means for Solving Problem

In order to achieve the above object, the present invention provides an attribute value estimation device for estimating, from data input thereto, an attribute value of the data, including:
a data acquisition unit that acquires data for which an attribute value is to be estimated;
at least one estimation unit selected from: a discrete quantity estimation unit that estimates the attribute value as a discrete quantity; and a continuous quantity estimation unit that estimates the attribute value as a continuous quantity, the estimation unit estimating the attribute value based on the data acquired by the data acquisition unit and in accordance with a previously learned determination criterion; and
a LSPC (Least-Squares Probabilistic Classifier) that estimates the attribute value as a discrete quantity based on data input from the estimation unit; and
an integration unit that integrates an estimation value estimated by the estimation unit and a discrete quantity estimation value estimated by the least-squares probabilistic classifier.

The present invention also provides an attribute value estimation method for estimating, from input data, an attribute value of the data, including:
a data acquisition step of acquiring data for which an attribute value is to be estimated;
an estimation step of estimating the attribute value as at least one of a discrete quantity and a continuous quantity based on the data acquired in the data acquisition step and in accordance with a previously learned determination criterion;
a discrete quantity estimation step of estimating the attribute value as a discrete quantity based on data processed in the estimation step; and
an integration step of integrating an estimation value estimated in the estimation step and a discrete quantity estimation value estimated in the discrete quantity estimation step,
wherein a LSPC is used in the discrete quantity estimation step.

The present invention also provides a program that causes a computer to execute the attribute value estimation method according to the present invention.

The present invention also provides a recording medium having recorded thereon the program according to the present invention.

Effects of the Invention

According to the present invention, it is possible to obtain highly accurate estimation results even when people from multiple races are estimation targets.

MODE FOR CARRYING OUT THE INVENTION

Figure 1:
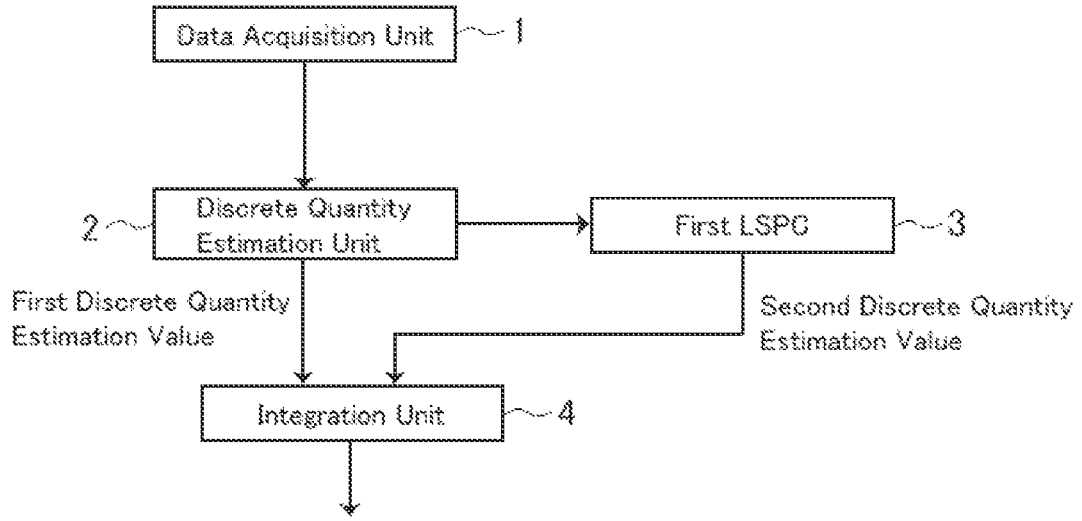
FIG. 1 is a block diagram showing an example (Embodiment 1) of the attribute value estimation device of the present invention.

The attribute value estimation device of the present invention preferably is configured so that it further includes: a scoring unit that scores the estimation value estimated by the estimation unit; and a discrete quantity scoring unit that scores the discrete quantity estimation value estimated by the LSPC, wherein the integration unit integrates a first score value obtained by the scoring unit and a second score value obtained by the discrete quantity scoring unit. Similarly, the attribute value estimation method of the present invention preferably is configured so that it further includes: a scoring step of scoring the estimation value estimated in the estimation step; and a discrete quantity scoring step of scoring the discrete quantity estimation value estimated by the LSPC in the discrete quantity estimation step, wherein, in the integration step, a first score value obtained in the scoring step and a second score value obtained in the discrete quantity scoring step are integrated.

The attribute value estimation device of the present invention preferably is configured so that the integration unit integrates the estimation value, the discrete quantity estimation value, and the score values with a weight being assigned to at least one of the estimation value, the discrete quantity estimation value, and the score values. Similarly, the attribute value estimation method of the present invention preferably is configured so that, in the integration step, the estimation value, the discrete quantity estimation value, and the score values are integrated with a weight being assigned to at least one of the estimation value, the discrete quantity estimation value, and the score values.

The attribute value estimation device and attribute value estimation method according to the present invention preferably are configured so that the LSPC previously learns the determination criterion, and in the learning of the determination criterion, the LSPC calculates a kernel function only when a class of an input feature quantity is the same as a correct class to which a training sample belongs. With this configuration, it is possible to further speed up calculations at the time of learning, for example.

The attribute value estimation device and attribute value estimation method according to the present invention preferably are configured so that the LSPC previously learns the determination criterion, and in the learning of the determination criterion, the center of kernel is placed in a class for which the number of training samples is the smallest. With this configuration, it is possible to further speed up calculations at the time of learning, for example.

The attribute value estimation device of the present invention preferably is configured so that at least one estimation unit selected from the discrete quantity estimation unit and the continuous quantity estimation unit includes a neural network, dimensionality reduction of the data acquired by the data acquisition unit is performed by the neural network, and the attribute value is estimated based on the dimensionality-reduced data, and the least-squares probabilistic classifier estimates the attribute value as a discrete quantity based on the dimensionality-reduced data. Similarly, the attribute value estimation method of the present invention preferably is configured so that, in the estimation step, at least one of the discrete quantity and the continuous quantity is estimated using a neural network, dimensionality reduction of the data acquired in the data acquisition step is performed by the neural network, and the attribute value is estimated based on the dimensionality-reduced data, and in the discrete quantity estimation step, the LSPC estimates the attribute value as a discrete quantity based on the dimensionality-reduced data.

The attribute value estimation device and attribute value estimation method according to the present invention preferably are configured so that the data acquired by the data acquisition unit and the data acquired in the data acquisition step are face image data, and the attribute value is a face attribute value.

The attribute value estimation device and attribute value estimation method according to the present invention preferably configured so that the face attribute value is at least one attribute value selected from the group consisting of age group, age, gender, and race.

Next, the attribute value estimation device, attribute value estimation method, program, and recording medium according to the present invention will be described with reference to illustrative examples. It is to be noted, however, that the present invention is by no means limited to the following examples. In FIGS. 1 to 6 to be described below, the same components are given the same reference numerals.

Embodiment 1

FIG. 1 shows a block diagram of an attribute value estimation device of the present embodiment. The attribute value estimation device of the present embodiment has a discrete quantity estimation unit as the estimation unit, and can be used for estimating an attribute value such as race or gender, for example. As shown in FIG. 1, the attribute value estimation device of the present embodiment includes, as main components, a data acquisition unit 1, a discrete quantity estimation unit 2, a first LSPC 3, and an integration unit 4. Examples of the data acquisition unit 1 include image acquisition units such as CCD (Charge Coupled Device) cameras, CMOS (Complementary Metal Oxide Semiconductor) cameras, and image scanners. The discrete quantity estimation unit 2 stores previously learned determination criteria. Each of the discrete quantity estimation unit 2, the first LSPC 3, and the integration unit 4 can be any dedicated hardware (e.g., a central processing unit (CPU) or the like), or can be realized on a computer by software processing, for example.

The discrete quantity estimation unit 2 extracts a feature quantity used for attribute value estimation from input data. Using the feature quantity extracted from the input data and the determination criteria, the discrete quantity estimation unit 2 estimates an attribute value of the input data as a discrete quantity. In the case where the attribute value is a race, for example, the discrete quantity may be white, black, yellow, Mongoloid, or mixed (biracial or multiracial), for example. In the case where the attribute value is a gender, the discrete quantity may be male or female, for example.

The discrete quantity estimation unit 2 can extract the feature quantity from the input data using a conventionally known method, examples of which include edge extraction and binarization.

The discrete quantity estimation unit 2 can estimate the attribute value as a discrete quantity from the feature quantity in accordance with the determination criteria using a conventionally known method, examples of which include: the use of a neural network, a Gaussian mixture model, or a support vector machine; linear discrimination analysis; logistic regression analysis; and a k-nearest neighbor classification method.

The first LSPC 3 estimates the attribute value as a discrete quantity based on, as a new feature quantity, data input from the discrete quantity estimation unit 2. The first LSPC 3 solves a posterior probability model in each class using a squared loss. Thus, the most distinctive feature of the first LSPC 3 is that it can achieve ultra-high speed learning. Besides, the first LSPC 3 models the posterior probability in the form of density ratio, so that it also has a feature that it is resistant to imbalance in the number of pieces of data among respective classes of training samples. For example, when people from multiple races are estimation targets, it is difficult to collect training samples evenly for various classifications such as age group, race, and gender. Thus, this feature of the first LSPC 3 is advantageous when the estimation targets are people from multiple races.

The first LSPC 3 estimates the posterior probability distribution p (y|x) of an attribute class y regarding an input feature quantity (facial feature quantity) x in the form of density ratio represented by the following Expression (1). Examples of the attribute class include age group classes, gender classes, and race classes.

$$p(y|x) = \frac{p(x, y)}{p(x)} \quad (1)$$

p(x): probability distribution of training samples
p(x,y): joint probability distribution of training samples In the end, the attribute class with the highest posterior probability (the left side of the following Expression (2)) is set to an estimated attribute class.

$$\hat{y} = \underset{y}{\mathrm{argmin}}\, p(y|x) \quad (2)$$

The first LSPC 3 learns the posterior probability p (y|x) using a squared loss. This allows, for example, the learning time to be reduced to one several hundredth while maintaining the pattern recognition accuracy equivalent to those achieved by conventional methods.

Moreover, since the posterior probability is estimated in the form of density ratio represented by Expression (1), the estimation result is less susceptible to the influence of imbalance in the number of pieces of training sample data among respective classes (e.g., the number of pieces of training sample data in a particular class is small).

Next, the least square fitting of the posterior probability will be described. First, the posterior probability of the attribute class y is modeled using the following linear model.

$$q(y|x;\alpha) = \sum_{l=1}^{b} \alpha_l \phi_l(x, y) \quad (3)$$

$\{\alpha_l\}_{l=1}^{b}$: parameter
$\{\phi_l(x,y)\}_{l=1}^{b}$: basis function that is non-negative The first LSPC 3 learns a parameter α (the following expression) in such a manner that the following square error $J_0$ is minimized.

$$\alpha = (\alpha_1, \ldots, \alpha_l)^T \quad (4)$$

$$J_0(\alpha) = \frac{1}{2}\int\sum_{y=1}^{c}(q(y|x;\alpha) - p(y|x))^2 p(x)dx$$
$$= \frac{1}{2}\int\sum_{y=1}^{c}(q(y|x;\alpha))^2 p(x)dx -$$
$$\int\sum_{y=1}^{c} q(y|x;\alpha)p(x, y)dx +$$
$$\frac{1}{2}\int\sum_{y=1}^{c}(p(y|x))^2 p(x)dx$$

The last term in the above expression is a constant and thus can be ignored. By approximating the expectation value J in the first two terms in the above expression by the sample mean, the following Expression (5) is obtained.

$$\hat{J}(\alpha) = \frac{1}{2}\alpha^T \hat{H}\alpha - \hat{h}^T\alpha \quad (5)$$

$$\begin{cases} \hat{H} = \frac{1}{n}\sum_{i=1}^{n}\sum_{y=1}^{c}\phi(x_i, y)\phi(x_i, y)^T \\ \hat{h} = \frac{1}{n}\sum_{i=1}^{n}\phi(x_i, y_i) \end{cases} \quad (5a)$$

An $l_2$-regularization term is added in order to prevent overfitting, thus yielding the following unconstrained optimization problem.

$$\hat{\alpha} = \underset{\alpha}{\mathrm{argmin}}\left[\frac{1}{2}\alpha^T \hat{H}\alpha - \hat{h}^T\alpha + \frac{\lambda}{2}\alpha^T\alpha\right] \quad (6)$$

The solution of Expression (6) is analytically given by the following Expression (7).

$$\tilde{\alpha} = (\hat{H} + \lambda I_b)^{-1}\hat{h} \quad (7)$$

$I_b$: b-dimensional unit matrix

Parameter correction is performed in accordance with the following Expression (8) so as to make all the parameters non-negative, thus ensuring the non-negativity of the posterior probability.

$$\hat{\alpha}_l = \max(0, \tilde{\alpha}_l) \text{ for } l=1,2,\ldots,b \quad (8)$$

Finally, normalized correlation is performed so as to make the sum of all the classes equal to 1, thus obtaining the solution of the posterior probability.

$$\hat{p}(y|x) = \frac{\alpha^T \phi(x, y)}{\sum_{y'=1}^{c}\alpha^T \phi(x, y')} \quad (9)$$

Alternatively, instead of the processes represented by Expressions (8) and (9), the following process may be performed to obtain the solution of the posterior probability.

$$\overline{p}(y|x) = \begin{cases} \frac{1}{Z}\max(0, \alpha^T\phi(x, y)) & \text{if } Z > 0 \\ \frac{1}{c} & \text{otherwise} \end{cases}$$

$$Z = \sum_{y'=1}^{c} \max(0, \alpha^T\phi(x, y'))$$

When estimating the discrete quantity of the attribute value, the discrete quantity estimation unit 2 and the first LSPC 3 may each output the discrete quantity estimation value accompanying stochastic representation of the estimation result. The discrete quantity estimation value accompanying stochastic representation of the estimation result may be as follows, for example: in the case where the attribute value is a race, the discrete quantity estimation value may be, for example, "the estimation target is white with a probability of 80% and black with a probability of 20%"; and in the case where the attribute value is a gender, the discrete quantity estimation value may be, for example, "the estimation target is male with a probability of 80% and female with a probability of 20%". With this configuration, in the case where it is estimated that the estimation target is female from part of its appearance but there is a possibility that the estimation target may be male according to any other determination criteria (e.g., the estimation target is a person with long hair), it is possible to output an estimation result with higher accuracy.

The integration unit 4 integrates a first discrete quantity estimation value estimated by the discrete quantity estimation unit 2 and a second discrete quantity estimation value estimated by the first LSPC 3. The integration unit 4 outputs, as an estimation result, an attribute class obtained after the integration. In the present embodiment, since the first discrete quantity estimation value and the second discrete quantity estimation value are integrated, there is no risk that the estimation accuracy of any particular attribute class might be low.

Furthermore, in the present embodiment, in order to further improve the learning speed of the first LSPC 3, at least one of (1) introduction of a delta kernel and (2) placement of the center of a kernel may be performed, for example.

First, (1) introduction of a delta kernel will be described. When the following training samples are given, the posterior probability model (Expression (3)) of each attribute class y is designed as represented by the following expression.

$$\{(x_i, y_i)\}_{i=1}^{l}$$

$x_i$: objective variable (facial feature quantity)
$y_i$: explanatory variable (attribute class)

$$q(y|x; \alpha) = \sum_{y'=1}^{c} \sum_{l=1}^{n} \alpha_i^{(y')}(x, x_i, y, y_i, y')$$

c: the number of attribute classes
n: the number of learning samples
K: kernel function determined by input feature quantity x, class y, similarity of training samples $\{(x_i, y_i)\}_{i=1}^{l}$, and class y'
  the number of parameters $\alpha_i^{(y')}$: cn
  calculation amount required to obtain analytic solution (Expression (7) above): $O(c^3n^3)$ At the time of learning, a "delta kernel" for calculating the kernel function is introduced only when a class of the input feature quantity x is the same as a correct class to which a training sample (in the present embodiment, the objective variable (facial feature quantity)) $x_i$ belongs.

$$K'(x, x_i, y, y_i, y') = K(x, x_i)\delta_{y, y'} \quad (10)$$

$\delta_{y,y'}$ is a Kronecker delta represented by the following Expression (11).

$$\delta_{y,y'} = \begin{cases} 1 & \text{if } y = y' \\ 0 & \text{otherwise} \end{cases} \quad (11)$$

This reduces the number of parameters (cn), thus turning the matrix in Expression (5a) to a block diagonal matrix for each attribute class. In this case, the calculation amount required to obtain the analytic solution (Expression (7)) is $O(cn^3)$.

Next, (2) placement of the center of a kernel will be described. In the class y, the value of the posterior probability p (y|x) is high in a region where the number of training samples is large whereas it is almost 0 (zero) in a region where the number of training samples is small. Therefore, the center of the kernel may be placed where there are training samples in the class.

This makes the block of the matrix of Expression (5a) still smaller, thus allowing the calculation amount for the inverse matrix to be reduced further.

Embodiment 2

Figure 2:
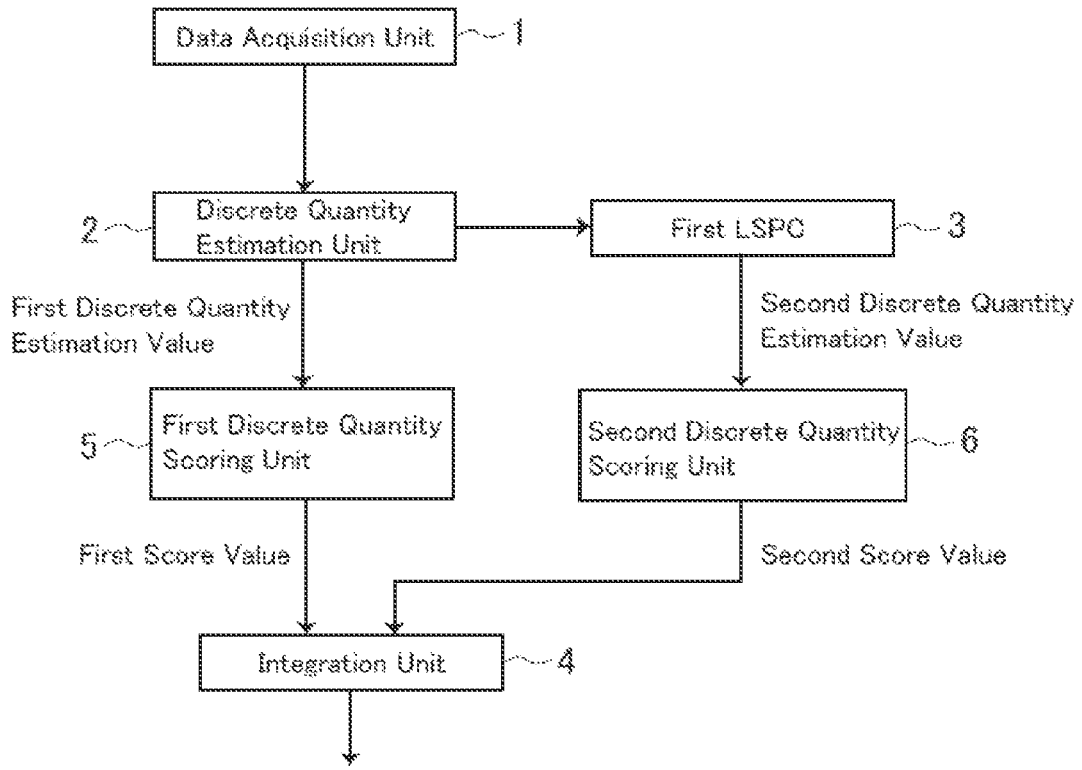
FIG. 2 is a block diagram showing another example (Embodiment 2) of the attribute value estimation device of the present invention.

FIG. 2 shows another configuration of the attribute value estimation device of the present invention. As shown in FIG. 2, this attribute value estimation device has the same configuration as the attribute value estimation device shown in FIG. 1, except that it further includes a first discrete quantity scoring unit 5 and a second discrete quantity scoring unit 6.

The attribute value estimation device and an attribute value estimation method according to the present embodiment will be described more specifically with reference to an example where the attribute value is a race, and the race estimation is performed for three classes, namely, white, Asian, and black.

The first discrete quantity scoring unit 5 scores a first discrete quantity estimation value estimated by the discrete quantity estimation unit 2, and outputs, as a first score value, certainty factors in the stochastic form (white: $p_1$, Asian: $p_2$, black: $p_3$).

The second discrete quantity scoring unit 6 scores a second discrete quantity estimation value estimated by the first LSPC 3, and outputs, as a second score value, certainty factors in the same form as described above (white: $q_1$, Asian: $q_2$, black: $q_3$).

The integration unit 4 assigns weights $\omega_1$ and $\omega_2$ determined in Embodiment 6 to be described below to the first score value and the second score value, respectively, and adds the thus-weighted first and second score values. Then, the integration unit 4 outputs, as an estimation result, the race having a highest score value among the following score values $R_1$, $R_2$, and $R_3$.

Score value for white: $R_1 = \omega_1 \cdot p_1 + \omega_2 \cdot q_1$

Score value for Asian: $R_2 = \omega_1 \cdot p_2 + \omega_2 \cdot q_2$

Score value for black: $R_3 = \omega_1 \cdot p_3 + \omega_2 \cdot q_3$

Embodiment 3

Figure 3:
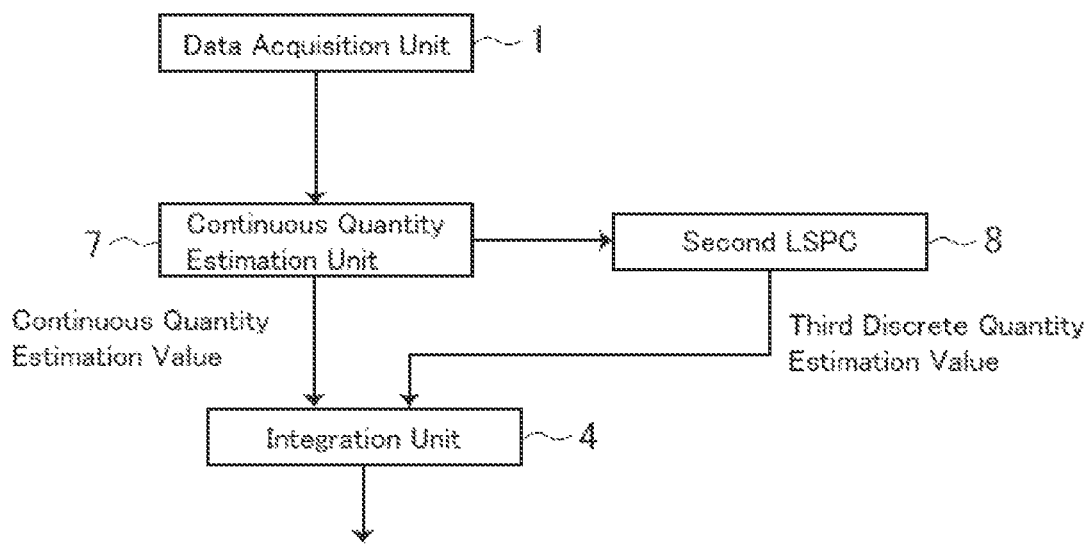
FIG. 3 is a block diagram showing still another example (Embodiment 3) of the attribute value estimation device of the present invention.

FIG. 3 shows still another example of the attribute value estimation device of the present invention. The attribute value estimation device of the present embodiment has a continuous quantity estimation unit as the estimation unit, and can be used for estimating an attribute value such as age group or age, for example. As shown in FIG. 3, this attribute value estimation device has the same configuration as the attribute value estimation device shown in FIG. 1, except that it includes a continuous quantity estimation unit 7 and a second LSPC 8 instead of the discrete quantity estimation unit 2 and the first LSPC 3. The continuous quantity estimation unit 7 stores previously learned determination criteria.

The continuous quantity estimation unit 7 extracts a feature quantity used for attribute value estimation from input data. Using the feature quantity extracted from the input data and the determination criteria, the continuous quantity estimation unit 7 estimates an attribute value of the input data as a continuous quantity. The continuous quantity estimation unit 7 can extract the feature quantity from the input data using a conventionally known method, examples of which include edge extraction and binarization.

The continuous quantity estimation unit 7 can estimate the attribute value from the feature quantity in accordance with the determination criteria using a conventionally known method, examples of which include: the use of a neural network; multiple regression analysis; support vector regression; kernel regularized weighted least squares; and a k-nearest neighbor classification method.

The second LSPC 8 estimates the attribute value as a discrete quantity based on, as a new feature quantity, data input from the continuous quantity estimation unit 7, in the same manner as the above-described first LSPC 3.

The integration unit 4 integrates a continuous quantity estimation value estimated by the continuous quantity estimation unit 7 and a third discrete quantity estimation value estimated by the second LSPC 8. The integration unit 4 outputs, as an estimation result, an attribute value (e.g., an age group, an age, or the like) obtained after the integration.

The attribute value estimation device of the present embodiment may be configured so that, for example: the continuous quantity estimation unit 7 includes a neural network; the second LSPC 8 outputs certainty factors for respective age group classes based on, as a new facial feature quantity, data whose dimensionality has been reduced by the neural network (e.g., intermediate 100-dimensional data); and an age group with the highest certainty factor is set to an estimated age group. In the case where the discrete quantity estimation unit 2 in Embodiments 1 and 2 includes a neural network as in the present example, the neural network may reduce the dimensionality of data as in the present example.

Embodiment 4

Figure 4:
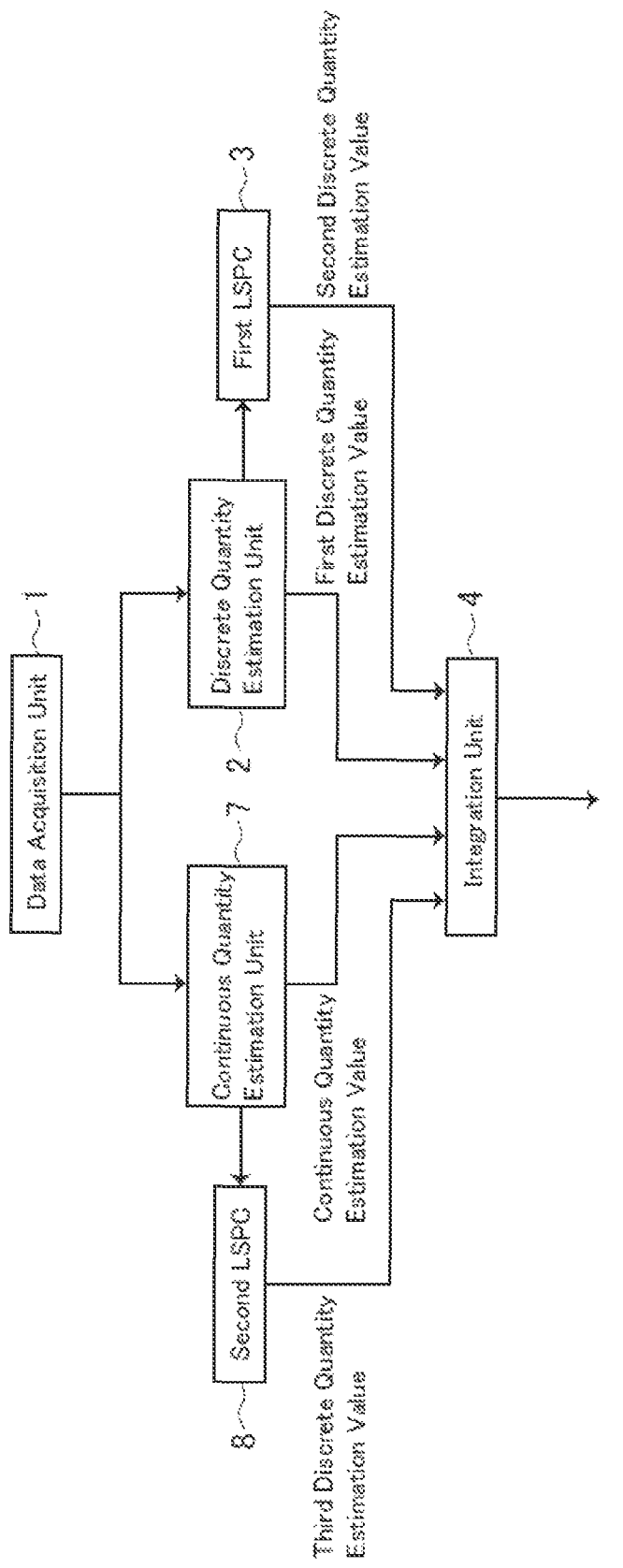
FIG. 4 is a block diagram showing still another example (Embodiment 4) of the attribute value estimation device of the present invention.

FIG. 4 shows still another example of the attribute value estimation device of the present invention. The attribute value estimation device of present embodiment has both a discrete quantity estimation unit and a continuous quantity estimation unit as the estimation units, and can be used for estimating an attribute value such as age group or age, for example. As shown in FIG. 4, this attribute value estimation device has the same configuration as the attribute value estimation device shown in FIG. 1, except that it further includes a continuous quantity estimation unit 7 and a second LSPC 8. The discrete quantity estimation unit 2 and the first LSPC 3 are as described in Embodiment 1. The continuous quantity estimation unit 7 and the second LSPC 8 are as described in Embodiment 3.

The integration unit 4 integrates a first discrete quantity estimation value estimated by the discrete quantity estimation unit 2, a second discrete quantity estimation value estimated by the first LSPC 3, a continuous quantity estimation value estimated by the continuous quantity estimation unit 7, and a third discrete quantity estimation value estimated by the second LSPC 8. The integration unit 4 outputs, as an estimation result, an attribute value (e.g., an age group, an age, or the like) obtained after the integration.

Embodiment 5

Figure 5:
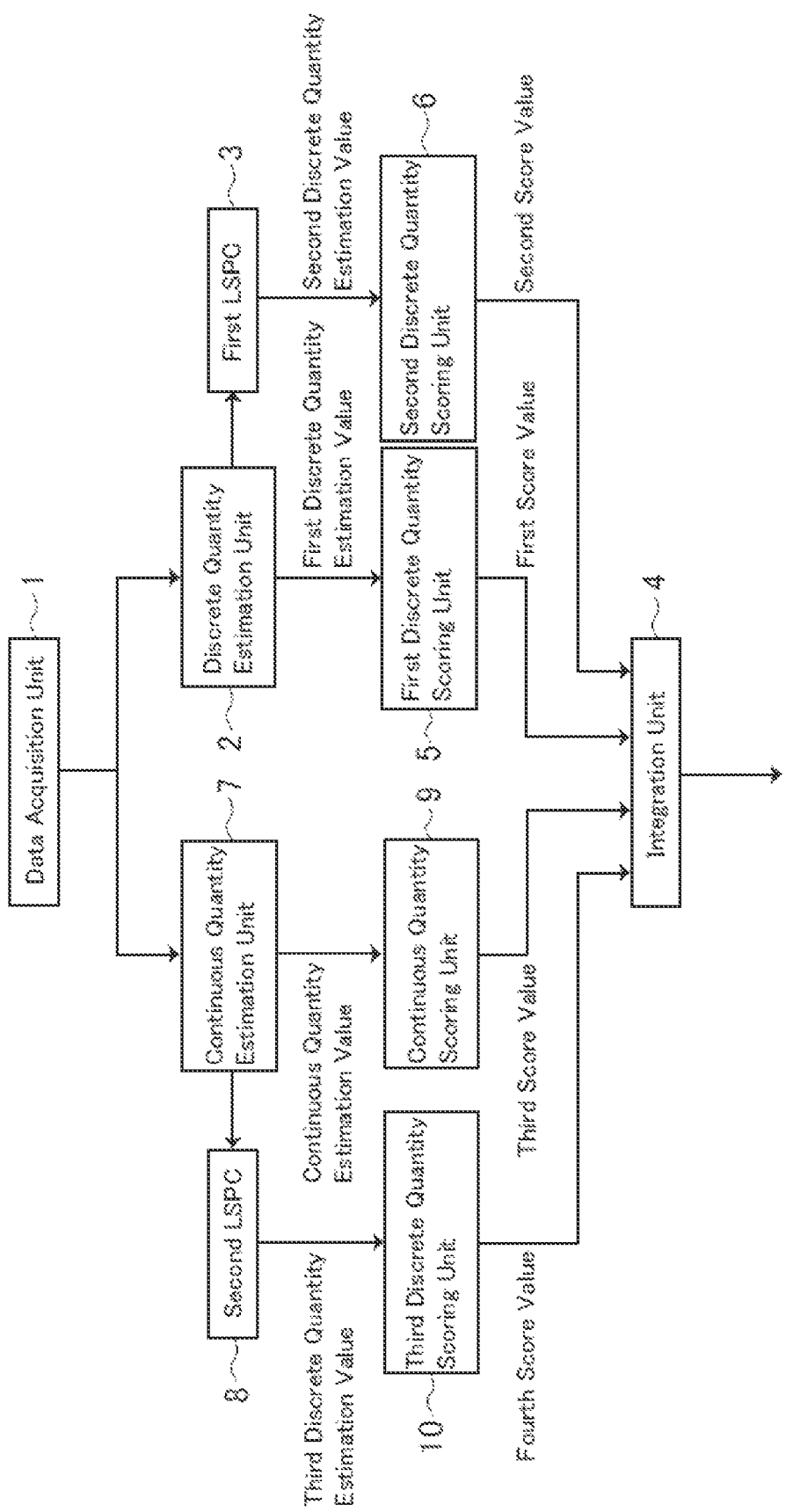
FIG. 5 is a block diagram showing still another example (Embodiment 5) of the attribute value estimation device of the present invention.

FIG. 5 shows still another example of the attribute value estimation device of the present invention. As shown in FIG. 5, this attribute value estimation device has the same configuration as the attribute value estimation device shown in FIG. 4, except that it further includes a first discrete quantity scoring unit 5, a second discrete quantity scoring unit 6, a continuous quantity scoring unit 9, and a third discrete quantity scoring unit 10. The first discrete quantity scoring unit 5 and the second discrete quantity scoring unit 6 are as described in Embodiment 2.

Scoring in the present embodiment will be described with reference to an example where the continuous quantity estimation unit 7 includes a neural network. In this example, the continuous quantity estimation unit 7 and the second LSPC 8 assign scores to the respective ages from 1 to 70 (at 1-year intervals), and scores are thus output in the vector form.

First, (1) scoring of an output from the neural network will be described. The neural network used in the present example has been trained through regression model learning so that it can perform age estimation at 1-year intervals. Thus, an output therefrom is in the form of a single scalar y (age). An output from the neural network is scored in the following manner, with consideration given to the fact that human age perception characteristics are nonuniform (Kazuya UEKI, Masashi SUGIYAMA, and Yasuyuki IHARA, "Omomitsuki-kaiki ni yoru ningen no chikaku-tokusei wo kouryo sita nen-rei-suitei (Age Estimation Considering Human Perception Characteristic by Weighted Regression)", Proceedings of the 15th Symposium on Sensing via Image Information (SSII09), no. IS4-23 (CD-ROM), Yokohama, 2009, 6. 10-12).

Figure 7A:
FIGS. 7A and 7B are each a graph showing the relationship between age and the standard deviation of estimation error.
Figure 7B:
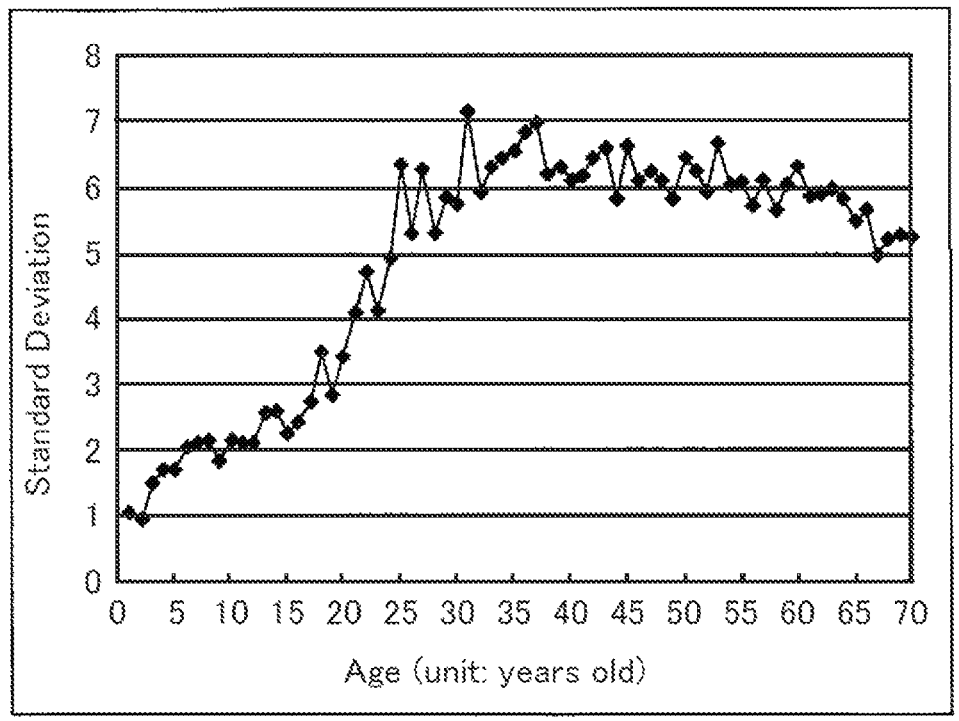

In this example, the mean value of perceived ages (apparent ages) of the same subject estimated by a plurality of estimators is set to a "real age". The standard deviation of estimation error in age perception with respect to the real age y is represented as $\omega_{age}(y)$. The $\omega_{age}(y)$ is nonuniform, as shown in FIGS. 7A and 7B. More specifically, while error in age perception for younger subjects is small, error in age perception for older subjects is great. FIG. 7A shows the standard deviation of error when the ages of female subjects at the respective ages were estimated from their face images, and FIG. 7B shows the standard deviation of error when the ages of male subjects at the respective ages were estimated from their face images.

Using this $\omega_{age}(\bullet)$ ("•" is the underlined part in the following expression), an output age from the neural network (the underlined part in the following expression) is scored in the following manner.

$$\text{output score: } f_1 = \{f_1(z)\}_{z=1}^{70} \quad (12)$$

respective components of $f_1$: $f_1(z) =$ $$\frac{1}{\sqrt{2\pi}\,\omega_{age}(\tilde{y})} \exp\left(-\frac{(z-\tilde{y})^2}{2\omega_{age}(\tilde{y})^2}\right)$$

$(z = 1, \ldots, 70)$

Figure 8:
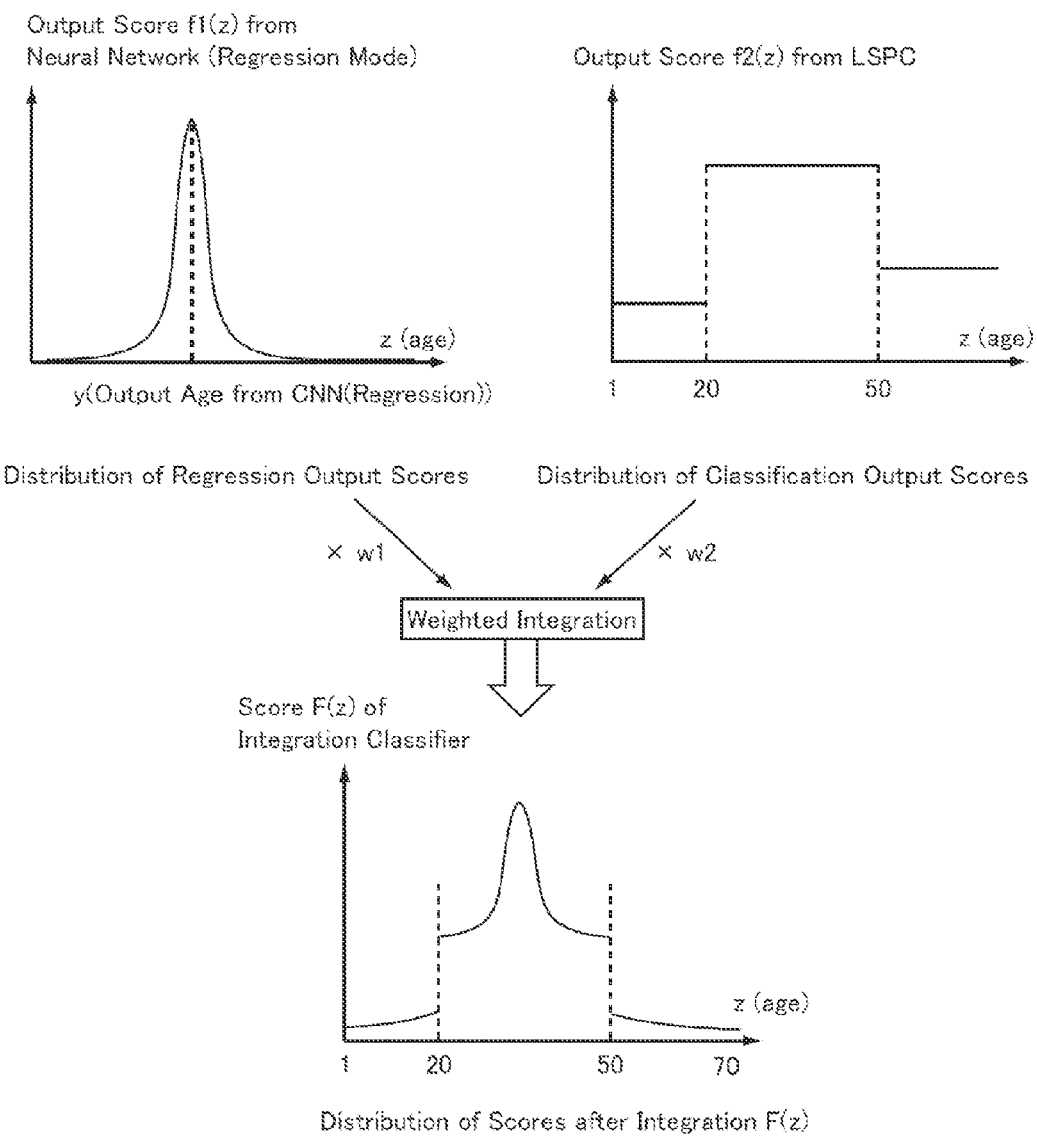
FIG. 8 shows graphs showing the distributions of score vector components before and after integration.

At this time, as shown in the upper left graph of FIG. 8, the distribution of the components of the score $f_1$ is in the form of normal distribution exhibiting small dispersion for younger subjects and large dispersion for older subjects, with the peak being formed when the output age is equal to the underlined part in the above expression. That is, scoring is performed so as to reflect the fact that there is a low probability that an estimated age for a younger subject might be an age around the real age of the subject while there is a high probability that an estimated age for an older subject might be an age around the real age of the subject.

Next, (2) scoring of an output from the second LSPC 8 will be described. The second LSPC 8 outputs certainty factors for the respective age groups in the stochastic form. In the present example, the scoring is performed so that an output from the second LSPC 8 is in the same form as the score $f_1$ assigned to the above-described output from the neural network.

For example, when age group estimation is performed for three classes, namely, an early age group (0 to 19 years old), a middle age group (20 to 49 years old), and an old age group (over 50 years old), it is assumed that the certainty factors output from the second LSPC 8 are as follows: the early age group: $p_1$, the middle age group: $p_2$, and the old age group: $p_3$.

At this time, a score is temporarily assigned to each age z (z=1, ... 70) in accordance with the following Expression (13).

$$\hat{f}_2(z) = p_i \tag{13}$$

Thereafter, the score is normalized using the following expression.

$$f_2(z) = \frac{\hat{f}_2(z)}{\sum_{z=1}^{70} \hat{f}_2(z)} \tag{14}$$

Then, the following expression is set to an output score from the second LSPC 8.

$$f_2 = \{f_2(z)\}_{z=1}^{70}$$

The upper right graph of FIG. 8 shows an image of the distribution of components of the output score vector from the second LSPC 8.

In the present embodiment, the integration unit 4 integrates a first score value obtained by the first discrete quantity scoring unit 5, a second score value obtained by the second discrete quantity scoring unit 6, a third score value obtained by the continuous quantity scoring unit 9, and a fourth score value obtained by the third discrete quantity scoring unit 10. The integration unit 4 outputs, as an estimation result, an age obtained after the integration.

Embodiment 6

The present embodiment is carried out using the attribute value estimation device shown in FIG. 5. The present embodiment is the same as Embodiment 5, except that the integration unit 4 performs the above-described integration with weighs being assigned to the third score value and the fourth score value.

In the present embodiment, weighting of output scores is carried out in the following manner, for example. Weights $\omega_1$ and $\omega_2$ are assigned respectively to scores obtained by the continuous quantity scoring unit 9 and the third discrete quantity scoring unit 10 regarding each age z (1≤z≤70, at 1-year intervals), and the thus-weighted scores are added to each other. The method for determining optimal weights will be described below.

$$F = \omega_1 \cdot f_1 + \omega_2 \cdot f_2 \tag{15}$$

$$\begin{cases} F = \{F(z)\}_{z=1}^{70} \\ F(z) = \omega_1 \cdot f_1(z) + \omega_2 \cdot f_2(z) \end{cases}$$

Then, an age group to which an age z* that satisfies $z^* = \mathrm{argmax}_z\{F(z)\}$ belongs is set to an output age group from the integration unit 4. The lower graph in FIG. 8 shows an image of the distribution of score vector components after the integration.

Next, the method for searching for the weights will be described. Using validation data (data that is not used in model learning), optimal weights $\omega_1$ and $\omega_2$ are searched for one by one thoroughly. More specifically, the evaluation of the integration unit 4 is performed using the validation data under the following conditions: numerical widths of $\omega_1$ and $\omega_2$: 0 to 1, search intervals: 0.01. A score having the highest score (the mean value of recognition rates in each category) when evaluated using the validation data is employed as an optimal weight.

Embodiment 7

Figure 6:
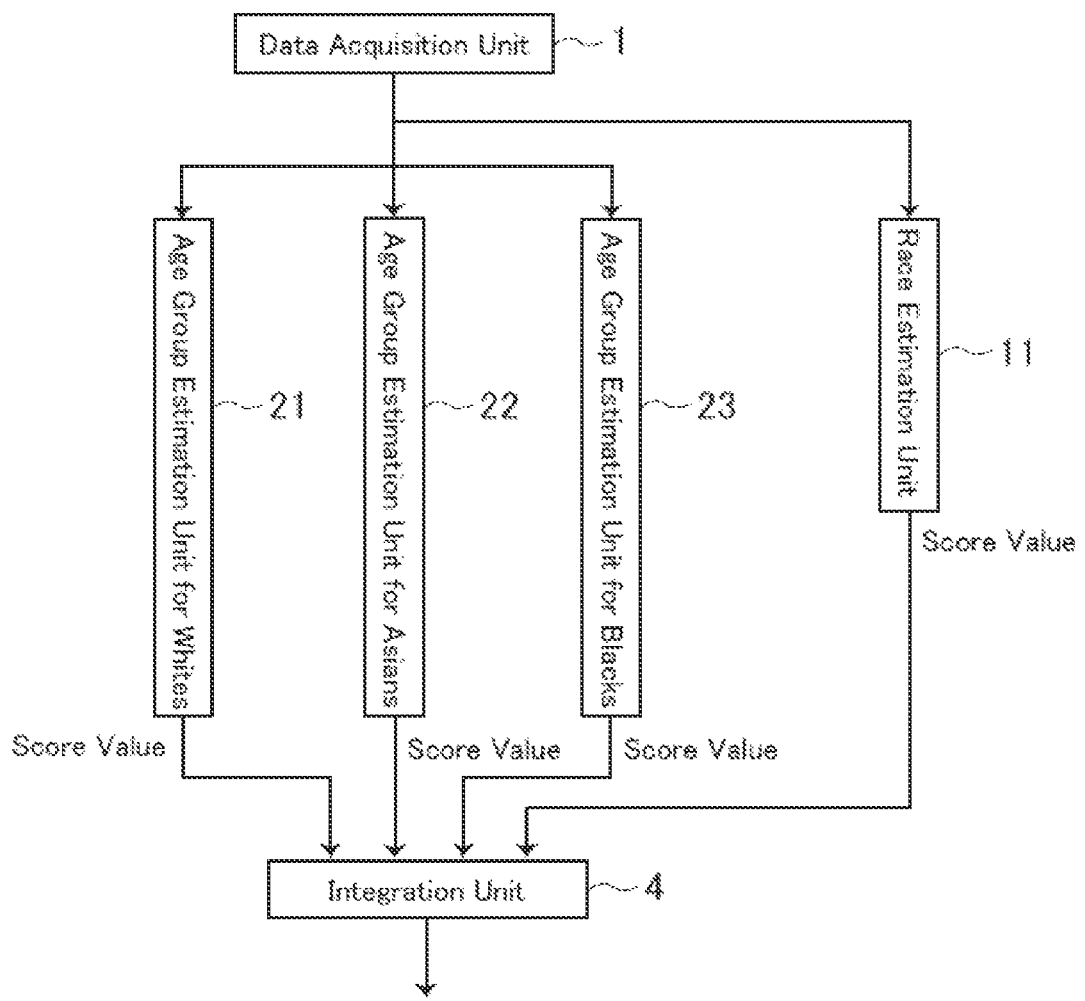
FIG. 6 is a block diagram showing still another example (Embodiment 7) of the attribute value estimation device of the present invention.

FIG. 6 shows still another example of the attribute value estimation device of the present invention. As shown in FIG. 6, this attribute value estimation device includes a data acquisition unit 1, a race estimation unit 11, an age group estimation unit 21 for whites, an age group estimation unit 22 for Asians, an age group estimation unit 23 for blacks, and an integration unit 4. The race estimation unit 11 includes the discrete quantity estimation unit 2, first LSPC 3, first discrete quantity scoring unit 5, and second discrete quantity scoring unit 6 of the attribute value estimation device shown in FIG. 2. The age group estimation unit 21 for whites, the age group estimation unit 22 for Asians, and the age group estimation unit for blacks 23 each include the discrete quantity estimation unit 2, first LSPC 3, first discrete quantity scoring unit 5, second discrete quantity scoring unit 6, continuous quantity estimation unit 7, second LSPC 8, continuous quantity scoring unit 9, and third discrete quantity scoring unit 10 of the attribute value estimation device shown in FIG. 5.

The attribute value estimation device and an attribute value estimation method according to the present embodiment will be described more specifically with reference to an example where the race estimation unit 11 performs race estimation for three classes, namely, white, Asian, and black.

The race estimation unit 11 outputs certainty factors in the stochastic form (white: $p_1$, Asian: $p_2$, black: $p_3$) as a score value.

The age group estimation unit 21 for whites, the age group estimation unit 22 for Asians, and the age group estimation unit 23 for blacks output, as score values at each age z (1≤z≤70, at 1-year intervals), the following Expressions (16) to (18), respectively.

$$\text{score value for white: } W = \{W(z)\}_{z=1}^{70} \tag{16}$$

$$\text{score value for Asian: } A = \{A(z)\}_{z=1}^{70} \tag{17}$$

$$\text{score value for black: } B = \{B(z)\}_{z=1}^{70} \tag{18}$$

Using the certainty factors (in the stochastic form) output from the race estimation unit 11, the integration unit 4 integrates the score values for each age z ($1 \leq z \leq 70$, at 1-year intervals) as shown below. The integration unit 4 outputs, as an age group estimation result including the race estimation, an age group to which an age z* that satisfies z*=argmax$_z${G (z)} belongs.

$$G = p_1 \cdot W + p_2 \cdot A + p_3 \cdot B$$

$$\begin{cases} G = \{G(z)\}_{z=1}^{70} \\ G(z) = p_1 \cdot W(z) + p_2 \cdot A(z) + p_3 \cdot B(z) \end{cases}$$

While the present invention has been described above with reference to illustrative embodiments, the present invention is by no means limited thereto. Various changes and modifications that may become apparent to those skilled in the art may be made in the configuration and specifics of the present invention without departing from the scope of the present invention.

This application claims priority from Japanese Patent Application No. 2010-273829 filed on Dec. 8, 2010. The entire disclosure of this Japanese patent application is incorporated herein by reference.

EXPLANATION OF REFERENCE NUMERALS 1 data acquisition unit
2 discrete quantity estimation unit
3 first LSPC (Least-Squares Probabilistic Classifier)
4 integration unit
5 first discrete quantity scoring unit
6 second discrete quantity scoring unit
7 continuous quantity estimation unit
8 second LSPC (Least-Squares Probabilistic Classifier)
9 continuous quantity scoring unit
10 third discrete quantity scoring unit
11 race estimation unit
21 age group estimation unit for whites
22 age group estimation unit for Asians
23 age group estimation unit for blacks

The invention claimed is:

1. An attribute value estimation device for estimating, from data input thereto, an attribute value of the data, the attribute value estimation device comprising:
   a data acquisition unit configured to acquire data for which an attribute value is to be estimated;
   an estimation unit configured to estimate an estimation value of the attribute value based on the data acquired by the data acquisition unit and in accordance with a previously learned determination criterion, the estimate unit comprising at least one of:
      a discrete quantity estimation unit configured to estimate the estimation value of the attribute value as a discrete quantity; and
      a continuous quantity estimation unit configured to estimate the estimation value of the attribute value as a continuous quantity;
   a least-squares probabilistic classifier configured to solve a posterior probability model in a class using a squared loss to estimate the attribute value as a discrete quantity based on data input from the estimation unit; and
   an integration unit configured to integrate the estimation value estimated by the estimation unit and the discrete quantity estimation value estimated by the least-squares probabilistic classifier.

2. The attribute value estimation device according to claim 1, further comprising:
   a scoring unit configured to score the estimation value estimated by the estimation unit; and
   a discrete quantity scoring unit configured to score the discrete quantity estimation value estimated by the least-squares probabilistic classifier,
   wherein the integration unit is further configured to integrate a first score value obtained by the scoring unit and a second score value obtained by the discrete quantity scoring unit.

3. The attribute value estimation device according to claim 2, wherein the integration unit is further configured to integrate the estimation value, the discrete quantity estimation value, the first score value, and the second score value with a weight being assigned to at least one of the estimation value, the discrete quantity estimation value, the first score value, and the second score value.

4. The attribute value estimation device according to claim 1, wherein the least-squares probabilistic classifier previously learns the determination criterion, and in the learning of the determination criterion, the least-squares probabilistic classifier calculates a kernel function only when a class of an input feature quantity is the same as a correct class to which a training sample belongs.

5. The attribute value estimation device according to claim 4, wherein, in the learning of the determination criterion, the least-squares probabilistic classifier places a center of the kernel in a class for which the number of training samples is the smallest.

6. The attribute value estimation device according to claim 1, wherein
   the at least one of the discrete quantity estimation unit and the continuous quantity estimation unit comprises a neural network,
   dimensionality reduction of the data acquired by the data acquisition unit is performed by the neural network,
   the attribute value is estimated based on the dimensionality-reduced data, and
   the least-squares probabilistic classifier is configured to estimate the discrete quantity estimation value of the attribute value as a discrete quantity based on the dimensionality-reduced data.

7. The attribute value estimation device according to claim 1, wherein the data acquired by the data acquisition unit comprises face image data, and the attribute value comprises a face attribute value.

8. The attribute value estimation device according to claim 7, wherein the face attribute value comprises at least one attribute value selected from among an age group, age, gender, and race.

9. An attribute value estimation method for estimating, from input data, an attribute value of the data, the attribute value estimation method comprising:
   a data acquisition step of acquiring data for which an attribute value is to be estimated;
   an estimation step of estimating an estimation value of the attribute value as at least one of a discrete quantity and a continuous quantity based on the data acquired in the data acquisition step and in accordance with a previously learned determination criterion;
   a discrete quantity estimation step of estimating, by a least-squares probabilistic classifier that solves a posterior probability model in a class using a squared loss, a discrete quantity estimation value of the attribute value as a discrete quantity based on data processed in the estimation step; and an integration step of integrating the estimation value estimated in the estimation step and the discrete quantity estimation value estimated in the discrete quantity estimation step.

10. The attribute value estimation method according to claim 9, further comprising:
   a scoring step of scoring the estimation value estimated in the estimation step; and
   a discrete quantity scoring step of scoring the discrete quantity estimation value estimated by the least-squares probabilistic classifier in the discrete quantity estimation step,
   wherein the integration step further comprises:
      integrating a first score value obtained in the scoring step, and
      integrating a second score value obtained in the discrete quantity scoring step.

11. The attribute value estimation method according to claim 10, wherein the integration step comprises integrating the estimation value, the discrete quantity estimation value, the first score value, and the second score value with a weight being assigned to at least one of the estimation value, the discrete quantity estimation value, the first score value, and the second score value.

12. The attribute value estimation method according to claim 9, wherein the least-squares probabilistic classifier previously learns the determination criterion, and in the learning of the determination criterion, the least-squares probabilistic classifier calculates a kernel function only when a class of an input feature quantity is the same as a correct class to which a training sample belongs.

13. The attribute value estimation method according to claim 12, wherein, in the learning of the determination criterion, a center of the kernel is placed in a class for which the number of training samples is the smallest.

14. The attribute value estimation method according to claim 9, wherein
   the estimation step comprises estimating the at least one of the discrete quantity and the continuous quantity using a neural network,
   the data acquisition step comprises performing, by the neural network, dimensionality reduction of the data acquired in the data acquisition step,
   the attribute value is estimated based on the dimensionality-reduced data, and
   the discrete quantity estimation step comprises estimating, by the least-squares probabilistic classifier, the discrete quantity estimation value of the attribute value as a discrete quantity based on the dimensionality-reduced data.

15. The attribute value estimation method according to claim 9, wherein the data acquired in the data acquisition step comprises face image data, and the attribute value comprises a face attribute value.

16. The attribute value estimation method according to claim 15, wherein the face attribute value comprises at least one attribute value selected from among an age group, age, gender, and race.

17. A non-transitory recording medium having recorded thereon a program that, when executed by a computer, causes a computer to execute an attribute value estimation method for estimating, from input data, an attribute, value of the data, the attribute value estimation method comprising:
   a data acquisition step of acquiring data for which an attribute value is to be estimated;
   an estimation step of estimating an estimation value of the attribute value as at least one of a discrete quantity and a continuous quantity based on the data acquired in the data acquisition step and in accordance with a previously learned determination criterion;
   a discrete quantity estimation step of estimating, by a least-squares probabilistic classifier that solves a posterior probability model in a class using a squared loss, a discrete quantity estimation value of the attribute value as a discrete quantity based on data processed in the estimation step; and
   an integration step of integrating the estimation value estimated in the estimation step and the discrete quantity estimation value estimated in the discrete quantity estimation step.

* * * * *